(12) United States Patent
Hagio et al.

(10) Patent No.: US 10,550,004 B2
(45) Date of Patent: Feb. 4, 2020

(54) PRODUCTION METHOD FOR ZEOLITE POWDER

(71) Applicant: NGK INSULATORS, LTD., Nagoya-Shi (JP)

(72) Inventors: Takeshi Hagio, Inazawa (JP); Makoto Miyahara, Tajimi (JP); Hiroyuki Shibata, Okazaki (JP); Makiko Ichikawa, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 16/140,989

(22) Filed: Sep. 25, 2018

(65) Prior Publication Data

US 2019/0023579 A1 Jan. 24, 2019

Related U.S. Application Data

(63) Continuation of application No. PCT/JP2017/007408, filed on Feb. 27, 2017.

(30) Foreign Application Priority Data

Mar. 31, 2016 (JP) .................................. 2016-072737

(51) Int. Cl.
*C01B 39/48* (2006.01)
*B01J 29/70* (2006.01)
(Continued)

(52) U.S. Cl.
CPC .............. *C01B 39/48* (2013.01); *B01J 29/06* (2013.01); *B01J 29/40* (2013.01); *B01J 29/70* (2013.01);
(Continued)

(58) Field of Classification Search
CPC ....... C01B 39/02; C01B 39/026; C01B 39/04; C01B 39/38; C01B 39/40; C01B 39/46;
(Continued)

(56) References Cited

U.S. PATENT DOCUMENTS 5,435,988 A 7/1995 Grebner et al.
10,239,760 B2 * 3/2019 Ueno ........................ B01J 20/18
(Continued)

FOREIGN PATENT DOCUMENTS

DE 4201455 A1 * 7/1993 ............. C01B 33/26
EP 2 394 958 A1 12/2011
(Continued)

OTHER PUBLICATIONS

English translation of International Preliminary Report on Patentability (Chapter I) (Application No. PCT/JP2017/007408) dated Oct. 11, 2018.
(Continued)

*Primary Examiner* — David M Brunsman
(74) *Attorney, Agent, or Firm* — Burr & Brown, PLLC

(57) ABSTRACT

A production method for zeolite powder includes disintegrating zeolite seed crystals in a silica unsaturated alkali solution containing an alkali source, preparing a silica saturated alkali solution by adding a silica source to the silica unsaturated alkali solution containing the zeolite seed crystals, and synthesizing zeolite powder by hermetically heating the silica saturated alkali solution.

11 Claims, 3 Drawing Sheets

(51) Int. Cl.
- *C01B 39/40* (2006.01)
- *B01J 29/40* (2006.01)
- *B01J 29/06* (2006.01)
- *B01J 37/10* (2006.01)
- *C01B 39/02* (2006.01)
- *C01B 39/38* (2006.01)
- *B01J 37/00* (2006.01)
- *C01B 39/04* (2006.01)
- *C01B 39/46* (2006.01)

(52) U.S. Cl.
CPC .......... *B01J 37/0072* (2013.01); *B01J 37/10* (2013.01); *C01B 39/02* (2013.01); *C01B 39/026* (2013.01); *C01B 39/04* (2013.01); *C01B 39/38* (2013.01); *C01B 39/40* (2013.01); *C01B 39/46* (2013.01); *B01J 2229/38* (2013.01); *C01P 2004/62* (2013.01)

(58) Field of Classification Search
CPC ...... C01B 39/48; C01P 2004/62; B01L 29/06; B01L 29/40; B01L 29/70; B01L 37/0072; B01L 37/10; B01L 2229/38
See application file for complete search history.

(56) References Cited

U.S. PATENT DOCUMENTS

| | | |
|---|---|---|
| 2011/0287261 A1 | 11/2011 | Yajima et al. |
| 2018/0072579 A1* | 3/2018 | Petrovic .................. C01B 39/04 |
| 2019/0023579 A1* | 1/2019 | Hagio ..................... C01B 39/02 |

FOREIGN PATENT DOCUMENTS

| | | |
|---|---|---|
| JP | S59-073423 A1 | 4/1984 |
| JP | 06-024731 A1 | 2/1994 |
| JP | 2004-083375 A1 | 3/2004 |
| JP | 2013-049602 A1 | 3/2013 |
| WO | 2010/090049 A1 | 8/2010 |

OTHER PUBLICATIONS

Toni Wakihara, et al., "Fabrication of Fine Zeolite with Improved Catalytic Properties by Bead Milling and Alkali Treatment," *Applied Materials & Interfaces*, 2010, vol. 2, Issue 10, pp. 2715-2718.

Toru Wakihara, et al., "Top-Down Tuning of Nanosized Zeolites by Bead-Milling and Recrystallization," *Journal of the Japan Petroleum Institute*, Sep. 1, 2013, vol. 56, No. 4, pp. 206-213.

Toru Wakihara, et al., "Bead-Milling and Postmilling Recrystallization: An Organic Template-Free Methodology for the Production of Nano-Zeolites," *Crystal Growth & Design*, 2011, vol. 11, pp. 955-958.

International Search Report and Written Opinion (Application No. PCT/JP2017/007408) dated May 23, 2017.

U.S. Appl. No. 16/142,361, filed Sep. 26, 2018, Hagio et al.

\* cited by examiner

PRODUCTION METHOD FOR ZEOLITE POWDER

TECHNICAL FIELD

The present invention relates to a production method for zeolite powder.

BACKGROUND

In the related art, methods are known for synthesizing zeolite powder using a raw material solution that contains an alkali source and a silica source and in which zeolite seed crystals are dispersed (see, for example, WO2010/090049 and Japanese Unexamined Patent Application Publication No. 2004-83375).

In Patent Document 1, a raw material solution is prepared by mixing a silica source in which zeolite seed crystals are dispersed into an alkali source. In Patent Document 2, a raw material solution is prepared by adding an alkali source to a mixture of water and a silica source and, thereafter, dispersing zeolite seed crystals.

SUMMARY

Reducing the particle size of zeolite powder leads to increases in the catalytic activity of the zeolite powder. As such, there is a demand for the synthesis of small particle size zeolite powder using fine zeolite seed crystals.

However, in the techniques discussed in Patent Documents 1 and 2, when fine zeolite seed crystals are used, the zeolite seed crystals aggregate in the raw material solution and, consequently, there is a limit as to how small the particle size of the zeolite powder can be made.

The present invention was made in view of the above background, and relates to a production method for small particle size zeolite powder.

A production method for zeolite powder according to the present invention includes disintegrating zeolite seed crystals in a silica unsaturated alkali solution containing an alkali source, preparing a silica saturated alkali solution by adding a silica source to the silica unsaturated alkali solution containing the zeolite seed crystals, and synthesizing zeolite powder by hermetically heating the silica saturated alkali solution.

According to the present invention, a production method for small particle size zeolite powder can be provided.

DETAILED DESCRIPTION OF THE PREFERRED EMBODIMENTS

Production Method for Zeolite Powder

Figure 1:
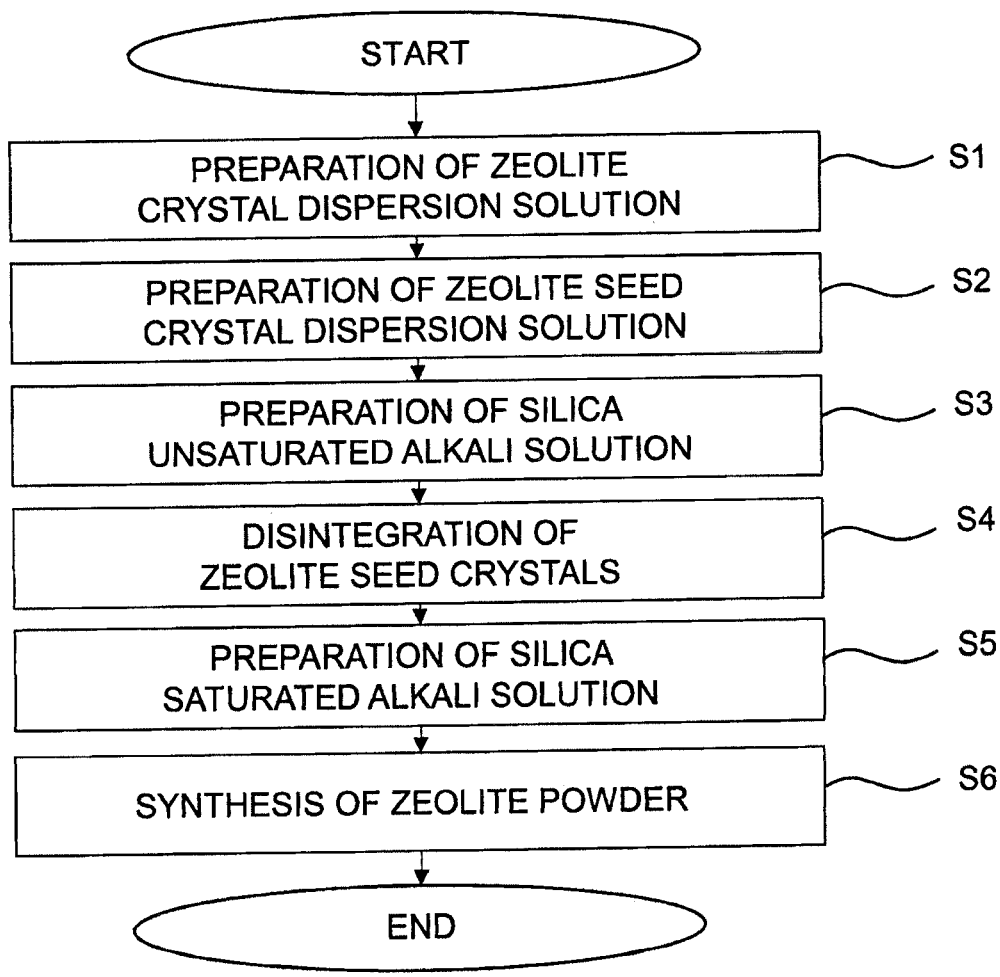
FIG. 1 is a flowchart illustrating a production method for zeolite powder.

Hereinafter a production method for zeolite powder according to embodiments of the present invention will be described with reference to the drawings. FIG. 1 is a flowchart illustrating a production method for zeolite powder.

1. Preparation of Zeolite Crystals (Step S1)

Figure 2:
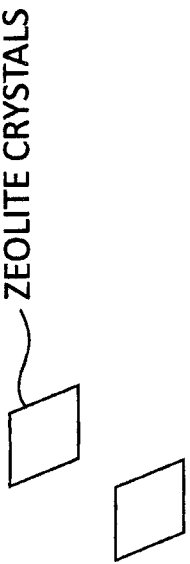
FIG. 2 is a schematic drawing illustrating zeolite crystals.

First, zeolite crystals are prepared. FIG. 2 is a schematic drawing illustrating zeolite crystals. The zeolite crystals used may be those synthesized via a known technique such as hydrothermal synthesis, or those commercially available. The zeolite crystals may be in a dry state or in a state dispersed in a solvent.

The type (framework) of the zeolite crystals is not particularly limited and can, for example, be selected from DDR, CHA, RHO, AFX, LTA, MFI, MOR, FER, FAU, and the like. While the type of the zeolite crystals is not particularly limited, it is preferable that the zeolite crystals are of the same crystal framework as the zeolite powder to be synthesized in order to realize efficient synthesis of the zeolite powder. Specifically, when synthesizing DDR framework zeolite powder, it is preferable that DDR framework zeolite crystals be used. Details of preparation methods for DDR framework zeolite crystals are described in M. J. den Exter, J. C. Jansen, H. Van Bekkum, Studies in Surface Science and Catalysis vol. 84, Ed. by J. Weitkamp et al., Elsevier (1994) 1159-1166.

An average particle size of the zeolite crystals is not particularly limited, but can be set to from 100 nm to 5,000 nm. From the perspective of fabricating zeolite seed crystals in a short period of time, the particle size of the zeolite crystals is preferably 500 nm or less and more preferably 300 nm or less. When the zeolite crystals are dispersed in a solvent (hereinafter referred to as "zeolite crystal dispersion solution"), the average particle size of the zeolite crystals is defined by the median diameter (d50) in a particle size distribution measurement obtained by the dynamic light scattering method. When the zeolite crystals are in a dry state, the average particle size of the zeolite crystals is defined by the average of area circle equivalent diameters (Heywood diameters) of ten primary particles randomly selected from an image observed using a transmission electron microscope (SEM).

The dispersion medium of the zeolite crystal dispersion solution is not particularly limited and water, an alcohol such as ethanol, a mixed solvent thereof, or the like can be used. From the perspectives of handling and cost, the dispersion medium is preferably water. The content of the zeolite crystals in the zeolite crystal dispersion solution is not particularly limited, but can, for example, be set to 1 wt % to 30 wt %.

2. Preparation of Zeolite Seed Crystals (Step S2)

Figure 3:
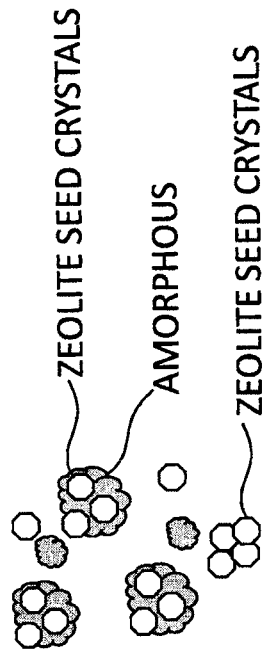
FIG. 3 is a schematic drawing illustrating zeolite seed crystals.

Next, zeolite seed crystals are prepared by wet or dry pulverization of the zeolite crystals. FIG. 3 is a schematic drawing illustrating zeolite seed crystals.

Wet pulverization can be carried out using a bead mill or the like. Dry pulverization can be carried out using a planetary ball mill or a mortar. The zeolite crystals are pulverized in the pulverization and zeolite seed crystals are fabricated.

The particle size of the zeolite seed crystals is not particularly limited, but can, for example, be set to from 10 nm to 300 nm. From the perspective of synthesizing small particle size zeolite powder, the particle size of the zeolite seed crystals is preferably 200 nm or less and more preferably 150 nm or less. As illustrated in FIG. 3, such fine zeolite seed crystals tend to aggregate due to an amorphous component, due to the attractive force between the zeolite seed crystals, or due to the impact force during pulverization.

The average particle size of the aggregated zeolite seed crystals is, when wet pulverized, defined by the median diameter (d50) in a particle size distribution measurement obtained by the dynamic light scattering method. When dry pulverized, the particles are assumed to be spherical and the average particle size of the aggregated zeolite seed crystals is defined by a particle size calculated from the specific surface area measured by the BET single-point method.

The pulverization time is not particularly limited, but can, for example, be set to from 30 minutes to 120 minutes. When wet pulverization is performed, the pulverized dispersion solution can be used without modification in the subsequent steps. However, considering that impurities may become mixed in when pulverizing, it is preferable that such impurities are removed by gravity separation such as centrifugation and, then, the zeolite seed crystals are recovered.

When wet pulverization is performed, a solution in which the zeolite seed crystals are dispersed (zeolite seed crystal dispersion solution) is obtained. The content of the zeolite seed crystals in the zeolite seed crystal dispersion solution is not particularly limited, but can, for example, be set to 0.5 wt % to 20 wt %.

3. Preparation of Silica Unsaturated Alkali Solution (Step S3)

Next a silica unsaturated alkali solution containing an alkali source is prepared.

Organic alkali, inorganic alkali, or a mixture thereof can be used as the alkali source. Ethylene diamine, hydrazine, ethanolamine, and the like can be used as the organic alkali. An alkali metal hydroxide such as sodium hydroxide (NaOH) and potassium hydroxide (KOH), an alkaline earth metal hydroxide such as $Ca(OH)_2$, or a mixture thereof can be used as the inorganic alkali.

The solvent may be omitted when using the organic alkali but, preferably, the organic alkali is mixed with water and used in order to reduce the degree of silica ($SiO_2$) saturation. When using the inorganic alkali, the solvent may be water, a lower alcohol, or a mixed solvent thereof.

Silica is in a non-saturated state in the silica unsaturated alkali solution. As described later, from the perspective of efficiently disintegrating the zeolite seed crystals, the degree of silica saturation in the silica unsaturated alkali solution is preferably low. The degree of silica saturation in the silica unsaturated alkali solution preferably is 30% or less, more preferably is 20% or less, and particularly preferably is substantially 0%. Note that it is sufficient that the silica in the silica unsaturated alkali solution is in a non-saturated state, and a portion of the silica source (described later) may be added to the silica unsaturated alkali solution.

The pH of the silica unsaturated alkali solution is not particularly limited but, as described later, from the perspective of avoiding re-aggregation of the zeolite seed crystals after disintegration, preferably is 11 or higher and more preferably is 11.5 or higher.

A structure directing agent (organic template) may be added to the silica unsaturated alkali solution. As a result of adding a structure directing agent to the silica unsaturated alkali solution, it is possible to increase the ratio of silicon atoms in the synthesized zeolite powder, thereby improving the acid resistance of the zeolite powder. The structure directing agent is not particularly limited, and amines, quaternary ammonium salts, and the like can be used. Examples of the amines include cations derived from alicyclic amines such as 1-adamantanamine, 3-quinacridinal, and 3-exo-aminonorbornene. Of these, when synthesizing a DDR framework zeolite, the structure directing agent is preferably a cation derived from 1-adamantanamine. When the structure directing agent is added to the silica unsaturated alkali solution, the structure directing agent is preferably dispersed in the silica unsaturated alkali solution by ultrasonic treatment or the like.

4. Disintegration of Zeolite Seed Crystals (Step S4)

Figures 4, 5:
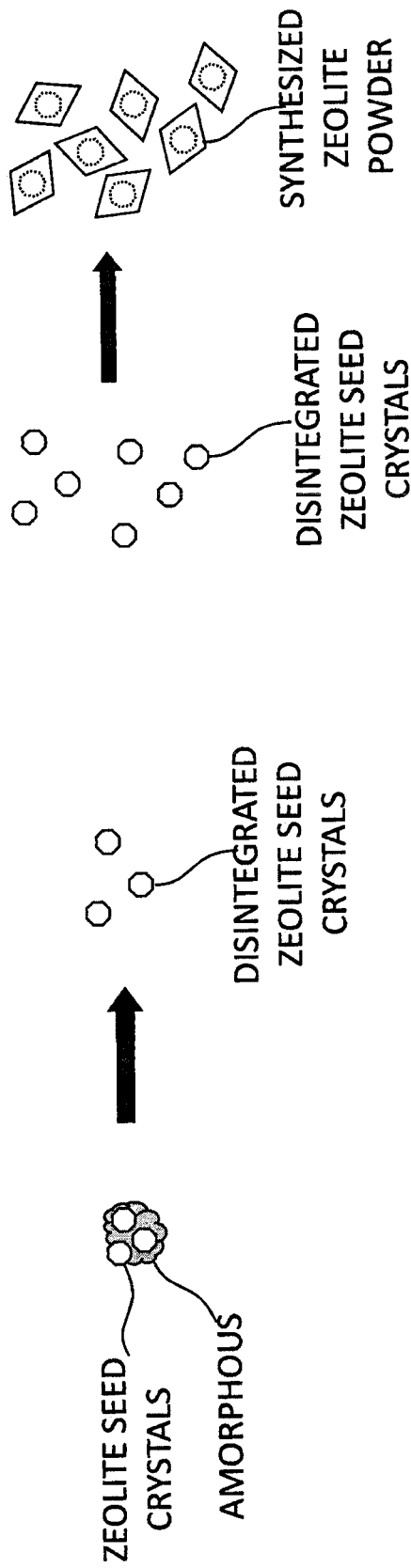
FIG. 4 is a schematic drawing illustrating zeolite seed crystals being disintegrated by a silica unsaturated alkali solution.
FIG. 5 is a schematic drawing illustrating zeolite powder being synthesized.

Next, the zeolite seed crystals are disintegrated by adding the zeolite seed crystals to the silica unsaturated alkali solution. Here, a case is described in which zeolite seed crystals obtained by wet pulverization and dispersed in the solvent (zeolite seed crystal dispersion solution) are used. FIG. 4 is a schematic drawing illustrating the zeolite seed crystals being disintegrated by the silica unsaturated alkali solution.

The zeolite seed crystals contained in the zeolite seed crystal dispersion solution are disintegrated by the silica unsaturated alkali solution. Specifically, as illustrated in FIG. 4, the zeolite seed crystals are individually separated from each other by dissolving the amorphous component aggregating the zeolite seed crystals or by dissolving the bonded portions of the zeolite seed crystals that have aggregated due to attractive forces. At this time, the separated state of the zeolite seed crystals is maintained due to the generation of intrinsic zeta potential, corresponding to the pH value of the silica unsaturated alkali solution, in the zeolite seed crystals.

The particle size of the disintegrated zeolite seed crystals is not particularly limited, but can, for example, be set to from 10 nm to 250 nm. From the perspective of synthesizing small particle size zeolite powder, the particle size of the disintegrated zeolite seed crystals preferably is 170 nm or less and more preferably is 100 nm or less. The average particle size of the disintegrated zeolite seed crystals is defined by the median diameter (d50) in a particle size distribution measurement obtained by the dynamic light scattering method.

The disintegration time is not particularly limited, but can, for example, be set to from 5 minutes to 240 minutes. From the perspective of sufficiently disintegrating the zeolite seed crystals, the disintegration time preferably is 5 minutes or longer, more preferably is 15 minutes or longer, and particularly preferably is 30 minutes or longer. Additionally, from the perspective of preventing complete dissolution of the zeolite seed crystals, the disintegration time preferably is 180 minutes or shorter, more preferably is 120 minutes or shorter, and particularly preferably is 60 minutes or shorter.

The content of the zeolite seed crystals in the silica unsaturated alkali solution is not particularly limited, but can, for example, be set to 0.1 wt % to 15 wt %.

5. Preparation of Silica Saturated Alkali Solution (Step S5)

Next, a silica saturated alkali solution is prepared by adding a silica source to the silica unsaturated alkali solution containing the disintegrated zeolite seed crystals.

For example, the silica source may be amorphous silica, colloidal silica, silica gel, sodium silicate, silicate gel of amorphous aluminum, tetraethoxysilane (TEOS), trimethylethoxysilane, mixtures thereof, or the like.

The silica is in a saturated state in the silica saturated alkali solution. The silica preferably is in a supersaturated state in the silica saturated alkali solution. That is, the degree of silica saturation in the silica saturated alkali solution preferably is greater than 100%.

The amount of the zeolite seed crystals in the silica saturated alkali solution is not particularly limited, but the content of the zeolite seed crystals in the silica saturated alkali solution can be set to 0.1 wt % to 10 wt %.

6. Synthesis of Zeolite Powder (Step S6)

Next, zeolite powder is hydrothermally synthesized by hermetically heating the silica saturated alkali solution. FIG. 5 is a schematic drawing illustrating the zeolite powder being synthesized.

The heating temperature of the hydrothermal synthesis is not particularly limited, but can be set to from 80° C. to 200° C. From the perspective of efficiently crystallizing the zeolite, the heating temperature of the hydrothermal synthesis preferably is 100° C. or higher and more preferably is 120° C. or higher. Additionally, to reduce the synthesis of zeolite powders of different crystal types than the zeolite seed crystals, the heating temperature of the hydrothermal synthesis preferably is 190° C. or lower and more preferably is 180° C. or lower.

The heating time of the hydrothermal synthesis is not particularly limited, but can be set to from 1 hour to 10 days. From the perspective of sufficiently crystallizing the zeolite, the heating time of the hydrothermal synthesis preferably is 5 hours or longer and more preferably is 10 hours or longer. Additionally, to reduce the synthesis of zeolite powders of different crystal types than the zeolite seed crystals, the heating time of the hydrothermal synthesis preferably is 5 days or shorter and more preferably is 3 days or shorter.

The synthesized zeolite powder is washed with water and then heat treated to incinerate the structure directing agent. The heat treatment temperature is not particularly limited, but can be set to from 350° C. to 900° C. The heat treatment time can be set to from 0.5 hours to 200 hours.

OTHER EMBODIMENTS

In the embodiment described above, the zeolite seed crystal dispersion solution is added to the alkali source. However, a configuration is possible in which zeolite seed crystals prepared by dry pulverization or zeolite seed crystals recovered from the zeolite seed crystal dispersion solution and dried are added to the alkali source. In this case, the zeolite seed crystals are more likely to aggregate due to the drying, but the zeolite seed crystals can be separated from each other by disintegrating the zeolite seed crystals using the silica unsaturated alkali solution. Note that the zeolite seed crystals can be recovered from the zeolite seed crystal dispersion solution by filtration or decantation, or can be recovered by drying (at 80° C., for example) the zeolite seed crystal dispersion solution as-is.

In the embodiment described above, the structure directing agent is added to the silica unsaturated alkali solution, but the structure directing agent may be added to the silica saturated alkali solution. Additionally, a configuration is possible in which the structure directing agent is not added to the silica unsaturated alkali solution.

EXAMPLES

Next, examples of the present invention will be described. Note that the present invention shall not be construed to be limited in any way to the examples described hereinafter.

Example 1

1. Fabrication of Zeolite Seed Crystals

A DDR framework zeolite crystal dispersion solution containing DDR framework zeolite crystals having an average particle size of 1.1 μm was prepared in accordance with the method described in WO/2010/090049.

Next, the 500 g of the DDR framework zeolite crystal dispersion solution containing 7 wt % of DDR framework zeolite crystals was wet pulverized for 90 minutes using a bead mill. Then, DDR framework zeolite seed crystals were recovered while adding pure water. Thus, a DDR framework zeolite seed crystal dispersion solution containing 3.7 wt % solid content was fabricated.

2. Alkali Treatment 0.66 g of 1-adamantanamine (hereinafter referred to as "1-ADA") was added to 4.21 g of strong alkali ethylene diamine (hereinafter referred to as "EDA"). Then, ultrasonic waves were used to completely dissolve the 1-ADA. Thus, a silica unsaturated alkali solution was prepared. The pH of the silica unsaturated alkali solution was 12.2. The degree of silica saturation in the silica unsaturated alkali solution was 0%.

Next, 26.8 g of the DDR framework zeolite seed crystal dispersion solution was added to the silica unsaturated alkali solution and stirred for 30 minutes, thereby disintegrating the DDR framework zeolite seed crystals.

3. Synthesis of DDR Framework Zeolite Powder

A mixture of 32.6 g of colloidal silica ($SiO_2$ 30 wt % solution) as the silica source and 23.0 g of pure water was added to the silica unsaturated alkali solution containing the DDR framework zeolite seed crystals and stirred for 60 minutes. Thus, a silica saturated alkali solution was prepared.

Next, the silica saturated alkali solution was transferred to a 100 ml Teflon (registered trademark) container and hydrothermally synthesized (for 16 hours at 160° C.) using a hot air dryer. Thus, a DDR framework zeolite powder was synthesized. The recovery rate of the DDR framework zeolite powder, for which the 1-ADA was used as a reference, was substantially 100%. Then, the Teflon (registered trademark) container was cooled and, thereafter, the synthesized DDR framework zeolite powder was washed with 400 ml of pure water.

Next, the average particle size of the DDR framework zeolite powder according to Example 1 was measured using a particle size distribution measuring device (MICROTRAC UPA-EX150, manufactured by MicrotracBEL). The average particle size in this case was 175 nm. Additionally, the crystal phase of the DDR framework zeolite powder according to Example 1 was confirmed, using an X-ray diffractometer, to be DDR framework.

Example 2

1. Fabrication of Zeolite Seed Crystals

A DDR framework zeolite crystal dispersion solution containing DDR framework zeolite crystals having an average particle size of 179 nm was prepared via the same method used in Example 1.

Next, 30 g of EDA was added to 500 g of the DDR framework zeolite crystal dispersion solution containing 7 wt % of DDR framework zeolite crystals and, then, the resulting mixture was wet pulverized for 90 minutes using a bead mill. Then, DDR framework zeolite seed crystals were recovered while adding pure water. Thus, a DDR framework zeolite seed crystal dispersion solution containing 3.7 wt % solid content was fabricated.

2. Alkali Treatment

Then, a silica unsaturated alkali solution was prepared via the same method used in Example 1. Next, 26.8 g of the DDR framework zeolite seed crystal dispersion solution was added to the silica unsaturated alkali solution and irradiated with ultrasonic waves for 30 minutes, thereby disintegrating the DDR framework zeolite seed crystals.

3. Synthesis of DDR Framework Zeolite Powder

A mixture of 32.6 g of colloidal silica ($SiO_2$ 30 wt % solution) as the silica source and 110.3 g of pure water was added to the silica unsaturated alkali solution containing the DDR framework zeolite seed crystals and stirred for 60 minutes. Thus, a silica saturated alkali solution was prepared.

Next, the silica saturated alkali solution was transferred to a 100 ml Teflon (registered trademark) container and hydrothermally synthesized (for 16 hours at 140° C.) using a hot air dryer. Thus, a DDR framework zeolite powder was synthesized. Then, the Teflon (registered trademark) container was cooled and, thereafter, the synthesized DDR framework zeolite powder was washed with 400 ml of pure water. The recovery rate of the DDR framework zeolite powder, for which the 1-ADA was used as a reference, was substantially 100%.

Next, the average particle size of the DDR framework zeolite powder according to Example 2 was measured via the same method used in Example 1, and found to be 143 nm. Additionally, the crystal phase of the DDR framework zeolite powder according to Example 2 was confirmed to be DDR framework via the same method used in Example 1.

Example 3

The DDR framework zeolite powder was synthesized via the same method as in Example 2, with the exception of the hydrothermal synthesis conditions being set to 20 hours at 120° C. The recovery rate of the DDR framework zeolite powder, for which the 1-ADA was used as a reference, was 90% or greater.

The average particle size of the DDR framework zeolite powder according to Example 3 was measured via the same method used in Example 1, and found to be 114 nm. Additionally, the crystal phase of the DDR framework zeolite powder according to Example 3 was confirmed to be DDR framework via the same method used in Example 1.

Example 4

The DDR framework zeolite powder was synthesized via the same method as in Example 3, with the exception of being irradiated with ultrasonic waves for 60 minutes in the alkali treatment. The recovery rate of the DDR framework zeolite powder, for which the 1-ADA was used as a reference, was 90% or greater.

The average particle size of the DDR framework zeolite powder according to Example 4 was measured via the same method used in Example 1, and found to be 114 nm. Additionally, the crystal phase of the DDR framework zeolite powder according to Example 4 was confirmed to be DDR framework via the same method used in Example 1.

Example 5

The DDR framework zeolite powder was synthesized via the same method as in Example 1, with the exception that, in the alkali treatment, the 1-ADA was added to a silica unsaturated alkali solution in which a 10M NaOH aqueous solution was used instead of the EDA and then irradiated with ultrasonic waves for 20 minutes to obtain a white turbid silica unsaturated alkali solution, to which the DDR framework zeolite seed crystal dispersion solution was added. The pH of the silica unsaturated alkali solution was 14.4. The degree of silica saturation in the silica unsaturated alkali solution was 0%. The recovery rate of the DDR framework zeolite powder, for which the 1-ADA was used as a reference, was substantially 100% or greater.

The average particle size of the DDR framework zeolite powder according to Example 5 was measured via the same method used in Example 1, and found to be 164 nm. Additionally, the crystal phase of the DDR framework zeolite powder according to Example 5 was confirmed to be DDR framework via the same method used in Example 1.

Example 6

The DDR framework zeolite powder was synthesized via the same method as in Example 1, with the exception that, in the alkali treatment, the 1-ADA was added to a silica unsaturated alkali solution in which a 1M NaOH aqueous solution was used instead of the EDA and then irradiated with ultrasonic waves for 20 minutes to obtain a white turbid silica unsaturated alkali solution, to which the DDR framework zeolite seed crystal dispersion solution was added. The pH of the silica unsaturated alkali solution was 13.9. The degree of silica saturation in the silica unsaturated alkali solution was 0%. The recovery rate of the DDR framework zeolite powder, for which the 1-ADA was used as a reference, was substantially 100% or greater.

The average particle size of the DDR framework zeolite powder according to Example 6 was measured via the same method used in Example 1, and found to be 115 nm. Additionally, the crystal phase of the DDR framework zeolite powder according to Example 6 was confirmed to be DDR framework via the same method used in Example 1.

Example 7

The DDR framework zeolite powder was synthesized via the same method as in Example 2, with the exception that, in the alkali treatment, the silica unsaturated alkali solution was prepared using a 1M NaOH aqueous solution instead of the EDA. The pH of the silica unsaturated alkali solution was 14.0. The degree of silica saturation in the silica unsaturated alkali solution was 0%. The recovery rate of the DDR framework zeolite powder, for which the 1-ADA was used as a reference, was 90% or greater.

The average particle size of the DDR framework zeolite powder according to Example 7 was measured via the same method used in Example 1, and found to be 102 nm. Additionally, the crystal phase of the DDR framework zeolite powder according to Example 7 was confirmed to be DDR framework via the same method used in Example 1.

Example 8

The DDR framework zeolite powder was synthesized via the same method as in Example 4, with the exception that, in the alkali treatment, the silica unsaturated alkali solution was prepared using a 1M NaOH aqueous solution instead of the EDA. The pH of the silica unsaturated alkali solution was 13.9. The degree of silica saturation in the silica unsaturated alkali solution was 0%. The recovery rate of the DDR framework zeolite powder, for which the 1-ADA was used as a reference, was 90% or greater.

The average particle size of the DDR framework zeolite powder according to Example 8 was measured via the same method used in Example 1, and found to be 105 nm. Additionally, the crystal phase of the DDR framework zeolite powder according to Example 8 was confirmed to be DDR framework via the same method used in Example 1.

Example 9

The DDR framework zeolite powder was synthesized via the same method as in Example 4, with the exception that the DDR framework zeolite seed crystal dispersion solution was prepared by drying a DDR framework zeolite seed crystal dispersion solution fabricated by wet pulverization, and then redispersing the resulting dry product in pure water. The recovery rate of the DDR framework zeolite powder, for which the 1-ADA was used as a reference, was 90% or greater.

The average particle size of the DDR framework zeolite powder according to Example 9 was measured via the same method used in Example 1, and found to be 126 nm. Additionally, the crystal phase of the DDR framework zeolite powder according to Example 9 was confirmed to be DDR framework via the same method used in Example 1.

Example 10

The DDR framework zeolite powder was synthesized via the same method as in Example 5, with the exception that the DDR framework zeolite seed crystal dispersion solution was prepared by dry pulverizing DDR framework zeolite crystals in a ball mill for seven days, dispersing the dry resulting product in pure water and then, in the alkali treatment, irradiating with ultrasonic waves for 60 minutes. The recovery rate of the DDR framework zeolite powder, for which the 1-ADA was used as a reference, was substantially 100%.

The average particle size of the DDR framework zeolite powder according to Example 10 was measured via the same method used in Example 1, and found to be 218 nm. Additionally, the crystal phase of the DDR framework zeolite powder according to Example 10 was confirmed to be DDR framework via the same method used in Example 1.

Example 11

1. Fabrication of Zeolite Seed Crystals

A 40 wt % tetrapropylammonium hydroxide aqueous solution (hereinafter referred to as "TPAOH") and tetrapropylammonium bromide (hereinafter referred to as "TPABr") were added to pure water and stirred until the mixture became clear. Then, colloidal silica ($SiO_2$ 30 wt % solution) as the silica source was added and the resulting mixture was stirred. Thus, a raw material solution having a composition ratio of 1 $SiO_2$: 0.36 TPAOH: 0.36 TPABr: 15 $H_2O$ was prepared. This raw material solution was transferred to a Teflon (registered trademark) container and hydrothermally synthesized (for 12 hours at 110° C.) using a hot air dryer. Thus, an MFI framework zeolite crystal dispersion solution containing MFI framework zeolite crystals having an average particle size of 204 nm was prepared.

Next, the 500 g of the MFI framework zeolite crystal dispersion solution containing 10 wt % of MFI framework zeolite crystals was wet pulverized for 10 days using a ball mill. Then, MFI framework zeolite seed crystals were recovered while adding pure water. Thus, an MFI framework zeolite seed crystal dispersion solution containing 4.8 wt % solid content was fabricated.

2. Alkali Treatment 2.01 g of the TPABr and 0.22 g of aluminum sulfate were added to 56.77 g of a strong alkali 5M NaOH aqueous solution. Then, the TPABr and the aluminum sulfate were completely dissolved by stirring. Thus, a silica unsaturated alkali solution was prepared. The pH of the silica unsaturated alkali solution was 13.0. The degree of silica saturation in the silica unsaturated alkali solution was 0%.

Next, 15.00 g of the MFI framework zeolite seed crystal dispersion solution was added to the silica unsaturated alkali solution and stirred for 10 minutes, thereby disintegrating the MFI framework zeolite seed crystals.

3. Synthesis of MFI Framework Zeolite Powder 6.00 g of colloidal silica ($SiO_2$ 30 wt % solution) as the silica source was added to the silica unsaturated alkali solution containing the MFI framework zeolite seed crystals and stirred for 60

Next, the silica saturated alkali solution was transferred to a 100 ml Teflon (registered trademark) container and hydrothermally synthesized (for 20 hours at 160° C.) using a hot air dryer. Thus, an MFI framework zeolite powder was synthesized. Then, the Teflon (registered trademark) container was cooled and, thereafter, the synthesized MFI framework zeolite powder was washed with 400 ml of pure water. The recovery rate of the MFI framework zeolite powder, for which the Al was used as a reference, was 90% or greater.

Next, the average particle size of the MFI framework zeolite powder according to Example 11 was measured via the same method used in Example 1, and found to be 168 nm. Additionally, the crystal phase of the MFI framework zeolite powder according to Example 11 was confirmed to be MFI framework via the same method used in Example 1.

Comparative Example 1

1. Fabrication of Zeolite Seed Crystals

A DDR framework zeolite crystal dispersion solution was fabricated via the same method used in Example 1.

2. Synthesis of DDR Framework Zeolite Powder 0.66 g of 1-ADA was added to and completely dissolved in 4.21 g of EDA.

Additionally, 26.8 g of the DDR framework zeolite seed crystal dispersion solution and 32.6 g of colloidal silica were added to 23.0 g of pure water and lightly stirred. Next, the EDA in which the 1-ADA had been dissolved was added and the resulting mixture was stirred for 60 minutes. Thus, a silica saturated alkali solution was prepared.

Next, as in Example 1, the silica saturated alkali solution was transferred to a 100 ml Teflon (registered trademark) container and hydrothermally synthesized (for 16 hours at 160° C.) using a hot air dryer. Thus, a DDR framework zeolite powder was synthesized. The recovery rate of the DDR framework zeolite powder, for which the 1-ADA was used as a reference, was substantially 100%. Then, the Teflon (registered trademark) container was cooled and, thereafter, the synthesized DDR framework zeolite powder was washed with 400 ml of pure water.

Next, the average particle size of the DDR framework zeolite powder according to Comparative Example 1 was measured via the same method used in Example 1. The average particle size in this case was 187 nm. Additionally, the crystal phase of the DDR framework zeolite powder according to Comparative Example 1 was confirmed to be DDR framework via the same method used in Example 1.

Comparative Example 2

1. Fabrication of Zeolite Seed Crystals

A DDR framework zeolite crystal dispersion solution containing DDR framework zeolite crystals having an average particle size of 179 nm was prepared via the same method used in Example 2.

Next, 30 g of EDA was added to 500 g of the DDR framework zeolite crystal dispersion solution containing 7 wt % of DDR framework zeolite crystals and, then, the resulting mixture was wet pulverized for 90 minutes using a bead mill. Then, DDR framework zeolite seed crystals were recovered while adding pure water. Thus, a DDR framework zeolite seed crystal dispersion solution containing 3.7 wt % solid content was fabricated.

2. Synthesis of DDR Framework Zeolite Powder 0.66 g of 1-ADA was added to and completely dissolved in 4.21 g of EDA. Additionally, 26.8 g of the DDR framework zeolite seed crystal dispersion solution and 32.6 g of colloidal silica were added to 110.3 g of pure water and lightly stirred. Next, the EDA in which the 1-ADA had been dissolved was added and the resulting mixture was irradiated with ultrasonic waves for 30 minutes. Thus, a silica saturated alkali solution was prepared.

Next, as in Example 2, the silica saturated alkali solution was transferred to a 100 ml Teflon (registered trademark) container and hydrothermally synthesized (for 16 hours at 140° C.) using a hot air dryer. Thus, a DDR framework zeolite powder was synthesized. The recovery rate of the DDR framework zeolite powder, for which the 1-ADA was used as a reference, was substantially 100%. Then, the Teflon (registered trademark) container was cooled and, thereafter, the synthesized DDR framework zeolite powder was washed with 400 ml of pure water.

Next, the average particle size of the DDR framework zeolite powder according to Comparative Example 2 was measured via the same method used in Example 1. The average particle size in this case was 153 nm. Additionally, the crystal phase of the DDR framework zeolite powder according to Comparative Example 2 was confirmed to be DDR framework via the same method used in Example 1.

Comparative Example 3

A DDR framework zeolite powder was synthesized via the same method as in Comparative Example 2, with the exception of the hydrothermal synthesis conditions being set to 20 hours at 120° C. The recovery rate of the DDR framework zeolite powder, for which the 1-ADA was used as a reference, was 90% or greater.

The average particle size of the DDR framework zeolite powder according to Comparative Example 3 was measured via the same method used in Example 1. The average particle size in this case was 137 nm. Additionally, the crystal phase of the DDR framework zeolite powder according to Comparative Example 3 was confirmed to be DDR framework via the same method used in Example 1.

Comparative Example 4

A DDR framework zeolite powder was synthesized via the same method as in Comparative Example 1, with the exception that, in the step of synthesizing the DDR framework zeolite powder, a 10M NaOH aqueous solution was used instead of the EDA, and a white turbid DDR framework zeolite seed crystal dispersion solution, obtained by adding the 1-ADA and then irradiating with ultrasonic waves for 20 minutes, was added. The recovery rate of the DDR framework zeolite powder, for which the 1-ADA was used as a reference, was substantially 100% or greater.

The average particle size of the DDR framework zeolite powder according to Comparative Example 4 was measured via the same method used in Example 1. The average particle size in this case was 182 nm. Additionally, the crystal phase of the DDR framework zeolite powder according to Comparative Example 4 was confirmed to be DDR framework via the same method used in Example 1.

Comparative Example 5

A DDR framework zeolite powder was synthesized via the same method as in Comparative Example 1, with the exception that, in the step of synthesizing the DDR framework zeolite powder, a 1M NaOH aqueous solution was used instead of the EDA, and a white turbid DDR framework zeolite seed crystal dispersion solution, obtained by adding the 1-ADA and then irradiating with ultrasonic waves for 20 minutes, was added. The recovery rate of the DDR framework zeolite powder, for which the 1-ADA was used as a reference, was 90% or greater.

The average particle size of the DDR framework zeolite powder according to Comparative Example 5 was measured via the same method used in Example 1. The average particle size in this case was 142 nm. Additionally, the crystal phase of the DDR framework zeolite powder according to Comparative Example 5 was confirmed to be DDR framework via the same method used in Example 1.

Comparative Example 6

In Comparative Example 4, a DDR framework zeolite powder was synthesized via the same method as in Comparative Example 2, with the exception that, in the step of synthesizing the DDR framework zeolite powder, a 1M NaOH aqueous solution was used instead of the EDA. The recovery rate of the DDR framework zeolite powder, for which the 1-ADA was used as a reference, was 90% or greater.

The average particle size of the DDR framework zeolite powder according to Comparative Example 6 was measured via the same method used in Example 1. The average particle size in this case was 133 nm. Additionally, the crystal phase of the DDR framework zeolite powder according to Comparative Example 5 was confirmed to be DDR framework via the same method used in Example 1.

Comparative Example 7

A DDR framework zeolite powder was synthesized via the same method as in Comparative Example 3, with the exception that, in the step of synthesizing the DDR framework zeolite powder, a 1M NaOH aqueous solution was used instead of the EDA. The recovery rate of the DDR framework zeolite powder, for which the 1-ADA was used as a reference, was 90% or greater.

The average particle size of the DDR framework zeolite powder according to Comparative Example 7 was measured via the same method used in Example 1. The average particle size in this case was 117 nm. Additionally, the crystal phase of the DDR framework zeolite powder according to Comparative Example 5 was confirmed to be DDR framework via the same method used in Example 1.

Comparative Example 8

A DDR framework zeolite powder was synthesized via the same method as in Comparative Example 3, with the exception that the DDR framework zeolite seed crystal dispersion solution was prepared by drying a DDR framework zeolite seed crystal dispersion solution fabricated by wet pulverization, and then redispersing the resulting dry product in pure water. The recovery rate of the DDR framework zeolite powder, for which the 1-ADA was used as a reference, was 90% or greater.

The average particle size of the DDR framework zeolite powder according to Comparative Example 8 was measured via the same method used in Example 1. The average particle size in this case was 352 nm. Additionally, the crystal phase of the DDR framework zeolite powder according to Comparative Example 8 was confirmed to be DDR framework via the same method used in Example 1.

Comparative Example 9

A DDR framework zeolite powder was synthesized via the same method as in Comparative Example 4, with the exception that the DDR framework zeolite seed crystal dispersion solution was prepared by dry pulverizing DDR framework zeolite crystals in a ball mill for seven days, dispersing the resulting dry product in pure water. The recovery rate of the DDR framework zeolite powder, for which the 1-ADA was used as a reference, was substantially 100% or greater.

The average particle size of the DDR framework zeolite powder according to Comparative Example 9 was measured via the same method used in Example 1. The average particle size in this case was 427 nm. Additionally, the crystal phase of the DDR framework zeolite powder according to Comparative Example 9 was confirmed to be DDR framework via the same method used in Example 1.

Comparative Example 10

1. Fabrication of Zeolite Seed Crystals
An MFI framework zeolite crystal dispersion solution was fabricated via the same method used in Example 11.
2. Synthesis of MFI Framework Zeolite Powder
2.01 g of TPABr, 0.22 g of aluminum sulfate, and 6.00 g of colloidal silica ($SiO_2$ 30 wt % solution) were added to 56.77 g of a 5M NaOH aqueous solution and stirred and, then, 15.00 g of the MFI framework zeolite seed crystal dispersion solution was added. Thus, a silica saturated alkali solution was prepared.

Next, as in Example 11, the silica saturated alkali solution was transferred to a 100 ml Teflon (registered trademark) container and hydrothermally synthesized (for 20 hours at 160° C.) using a hot air dryer. Thus, an MFI framework zeolite powder was synthesized. Then, the Teflon (registered trademark) container was cooled and, thereafter, the synthesized MFI framework zeolite powder was washed with 400 ml of pure water. The recovery rate of the MFI framework zeolite powder, for which the Al was used as a reference, was 90% or greater.

Next, the average particle size of the MFI framework zeolite powder according to Comparative Example 10 was measured via the same method used in Example 1. The average particle size in this case was 199 nm. Additionally, the crystal phase of the MFI framework zeolite powder according to Comparative Example 10 was confirmed to be MFI framework via the same method used in Example 1.

TABLE 1

| Sample No. | Alkali treatment time (min) | pH of silica unsaturated alkali solution | Hydrothermal synthesis conditions | | | Crystal framework | Ave. particle size of zeolite powder (nm) |
| --- | --- | --- | --- | --- | --- | --- | --- |
| | | | Temp. (° C.) | Time (hr) | Alkali source | | |
| Example 1 | 30 | 12.2 | 160 | 16 | EDA | DDR | 175 |
| Example 2 | 30 | 11.9 | 140 | 16 | EDA | DDR | 143 |
| Example 3 | 30 | 12.1 | 120 | 20 | EDA | DDR | 114 |
| Example 4 | 60 | 11.8 | 120 | 20 | EDA | DDR | 114 |
| Example 5 | 30 | 14.4 | 160 | 16 | 10M NaOH | DDR | 164 |
| Example 6 | 30 | 13.9 | 160 | 16 | 1M NaOH | DDR | 115 |
| Example 7 | 30 | 14.0 | 140 | 16 | 1M NaOH | DDR | 102 |
| Example 8 | 60 | 13.9 | 120 | 20 | 1M NaOH | DDR | 105 |
| Example 9 | 60 | 11.8 | 120 | 20 | EDA | DDR | 126 |
| Example 10 | 60 | 14.4 | 160 | 16 | 10M NaOH | DDR | 218 |
| Example 11 | 10 | 13 | 160 | 20 | 5M NaOH | MFI | 168 |
| Comparative Example 1 | | | 160 | 16 | EDA | DDR | 187 |
| Comparative Example 2 | | | 140 | 16 | EDA | DDR | 153 |
| Comparative Example 3 | | | 120 | 20 | EDA | DDR | 137 |
| Comparative Example 4 | | | 160 | 16 | NaOH | DDR | 182 |
| Comparative Example 5 | | | 160 | 16 | NaOH | DDR | 142 |
| Comparative Example 6 | | | 140 | 16 | NaOH | DDR | 133 |
| Comparative Example 7 | | | 120 | 20 | NaOH | DDR | 117 |
| Comparative Example 8 | | | 120 | 20 | EDA | DDR | 352 |
| Comparative Example 9 | | | 160 | 16 | NaOH | DDR | 427 |
| Comparative Example 10 | | | 160 | 20 | NaOH | MFI | 199 |

As shown in Table 1, in Example 1 in which, with the exception that the zeolite seed crystals being subjected to alkali treatment, the hydrothermal synthesis was performed under the same conditions as Comparative Example 1, it was possible to reduce the average particle size of the zeolite powder. This was due the silica unsaturated alkali solution disintegrating the zeolite seed crystals, thereby making it possible for the crystals to grow while each of the zeolite seed crystals were separated from each other.

Additionally, it was confirmed that the average particle size of the zeolite powder can be reduced by subjecting the zeolite seed crystals to the alkali treatment from comparisons of Example 2 with Comparative Example 2, Examples 3 and 4 with Comparative Example 3, Example 5 with Comparative Example 4, Example 6 with Comparative Example 5, Example 7 with Comparative Example 6, Example 8 with Comparative Example 7, Example 9 with Comparative Example 8, Example 10 with Comparative Example 9, and Example 11 with Comparative Example 10.

Moreover, it was confirmed from comparisons of Example 1 with Examples 5 and 6, Example 2 with Example 7, and Example 4 with Example 8 that the average particle size of the zeolite powder can be reduced regardless of the alkali source used in the alkali treatment. Additionally, the average particle size of the zeolite powder tended to be smaller when NaOH was used instead of EDA or when the pH was high.

Additionally, it was found from a comparison of Example 3 with Example 4 that, provided that the alkali treatment time is 30 minutes or greater, the average particle size of the zeolite powder can be reduced, regardless of the alkali treatment time.

Moreover, it was found from a comparison of Example 1 with Examples 5 and 6 that the average particle size of the zeolite powder can be reduced by increasing the pH of the silica unsaturated alkali solution used in the alkali treatment to higher than 13.9.

Additionally, since advantageous results were obtained in by Examples 9 and 10, it was confirmed that the zeolite seed crystals may be fabricated by wet pulverizing and then drying the zeolite crystals or the zeolite seed crystals may be fabricated by dry pulverizing the zeolite crystals.

Moreover, since advantageous results were obtained in Example 11 in which the MFI framework zeolite powder was synthesized, it was confirmed that the production method of the present invention is effective for powders other than DDR framework zeolite powders.

INDUSTRIAL APPLICABILITY

A production method for small particle size zeolite powder can be provided with the production method for zeolite powder according to the present invention. As such, the present invention is useful in the zeolite field.

What is claimed is:

1. A production method for zeolite powder comprising:
disintegrating zeolite seed crystals in a silica unsaturated alkali solution containing an alkali source;
preparing a silica saturated alkali solution by adding a silica source to the silica unsaturated alkali solution containing the zeolite seed crystals; and
synthesizing a zeolite powder by hermetically heating the silica saturated alkali solution.

2. The production method for zeolite powder according to claim 1, wherein
a degree of silica saturation in the silica unsaturated alkali solution is 30% or less.

3. The production method for zeolite powder according to claim 2, wherein
the degree of silica saturation in the silica unsaturated alkali solution is substantially 0%.

4. The production method for zeolite powder according to claim 1, wherein
the silica unsaturated alkali solution has a pH of 11 or higher.

5. The production method for zeolite powder according to claim 1, wherein
the silica unsaturated alkali solution contains at least one of ethylene diamine and sodium hydroxide as the alkali source.

6. The production method for zeolite powder according to claim 1, further comprising:
adding a structure directing agent to the silica unsaturated alkali solution or the silica saturated alkali solution before the step of synthesizing the zeolite powder.

7. The production method for zeolite powder according to claim 1, wherein
a period of time for disintegration in the step of disintegrating the zeolite seed crystals in the silica unsaturated alkali solution is five minutes or longer.

8. The production method for zeolite powder according to claim 1, further comprising:
fabricating the zeolite seed crystals by wet pulverizing zeolite crystals.

9. The production method for zeolite powder according to claim 1, further comprising:
fabricating the zeolite seed crystals by wet pulverizing and subsequently drying zeolite crystals.

10. The production method for zeolite powder according to claim 1, further comprising:
fabricating the zeolite seed crystals by dry pulverizing zeolite crystals.

11. The production method for zeolite powder according to claim 1, wherein
the zeolite seed crystals are DDR framework zeolite seed crystals or MFI framework zeolite seed crystals, and
the zeolite powder is a DDR framework zeolite powder or an MFI framework zeolite powder.

* * * * *